US008450689B2

United States Patent
Ohtake et al.

(10) Patent No.: US 8,450,689 B2
(45) Date of Patent: May 28, 2013

(54) DEVICE AND METHOD FOR MEASURING THICKNESS OF PAINT FILM IN NON-CONTACTING MANNER

(75) Inventors: Hideyuki Ohtake, Kariya (JP); Yuki Ichikawa, Ann Arbor, MI (US)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 301 days.

(21) Appl. No.: 12/635,339

(22) Filed: Dec. 10, 2009

(65) Prior Publication Data

US 2010/0149520 A1 Jun. 17, 2010

(30) Foreign Application Priority Data

Dec. 12, 2008 (JP) ................................. 2008-316586

(51) Int. Cl.
*G01B 15/02* (2006.01)
(52) U.S. Cl.
USPC ...................................................... 250/341.1
(58) Field of Classification Search
CPC ............................ G01N 21/3586; G01B 15/02
USPC ...................................................... 250/341.1
See application file for complete search history.

(56) References Cited

FOREIGN PATENT DOCUMENTS

| JP | 3326961 B2 | 9/2002 |
|---|---|---|
| JP | 2004-028618 A | 1/2004 |
| JP | 2004-101510 A | 4/2004 |
| JP | 3542346 B2 | 7/2004 |

OTHER PUBLICATIONS

JP-2004101510-A, Machine Translation.*
JP-2004028618-A, Machine Translation.*
Woodward, Ruth M., et al., "Terahertz Pulse Imaging of Ex Vivo Basal Cell Carcinoma," Journal of Investigative Dermatology, vol. 120, No. 1, Jan. 2003, pp. 72-78.
Carwley, D. et al., "Three-Dimensional Terahertz Pulse Imaging of Dental Tissue," Journal of Biomedical Optics Apr. 2003 SPIE US, vol. 8, No. 2, pp. 303-307.
Gonzales, R.C. et al., "Digital Image Processing" Sep. 1992, Addison-Wesley, pp. 279-281.
Ferguson, B., et al., "De-Noising Techniques for Terahertz Responses of Biological Samples," Microelectronics Journal, Mackintosh Publications Ltd., Luton, GB, vol. 32, No. 12, Dec. 1, 2001, pp. 943-953.
European Search Report dated Apr. 14, 2010 (9 pages).

* cited by examiner

*Primary Examiner* — Constantine Hannaher
(74) *Attorney, Agent, or Firm* — Sughrue Mion, PLLC (57) ABSTRACT

A non-contacting type paint film thickness measuring device includes a generating portion for generating a terahertz pulse light, a detecting portion for detecting the terahertz pulse light, a measured wave form in time-series obtaining portion for obtaining a measured wave form indicating an electric field intensity of a terahertz echo pulse light, and an intrinsic wave form in time-series obtaining portion, having an intrinsic electric field spectrum calculating portion and an intrinsic wave form in time-series calculating portion, for calculating an intrinsic wave form in time-series of an object.

4 Claims, 9 Drawing Sheets

10: Lock-in amplifier
11: A/D converter

FIG. 10A
Vehicle body paint

FIG. 10B
Time waveform

DEVICE AND METHOD FOR MEASURING THICKNESS OF PAINT FILM IN NON-CONTACTING MANNER

CROSS REFERENCE TO RELATED APPLICATIONS

This application is based on and claims priority under 35 U.S.C. §119 to Japanese Patent Application 2008-316586, filed on Dec. 12, 2008, the entire content of which is incorporated herein by reference.

TECHNICAL FIELD

This disclosure relates to a device and a method for measuring a thickness of a paint film formed on a substrate, especially for measuring a thickness of a paint film in a non-contacting manner by applying a terahertz pulse light to an object whose paint film thickness is measured.

BACKGROUND DISCUSSION

Figure 10A:
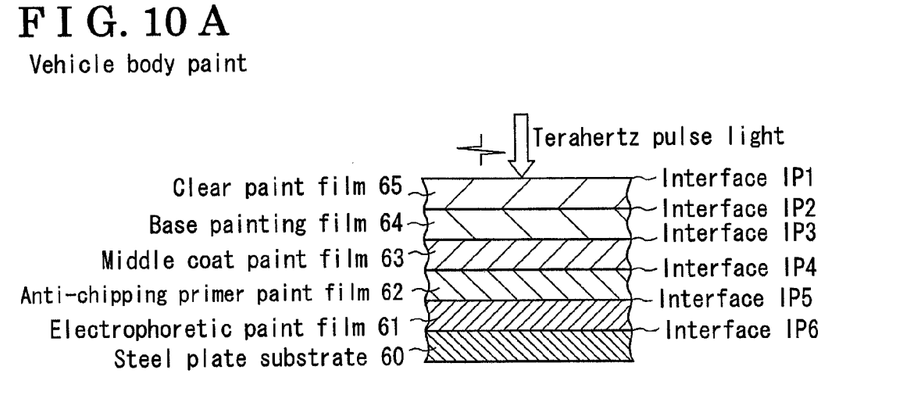
FIG. 10A illustrates an example of a cross section of multilayer paint films of a automobile body paint for expressing a paint film thickness measuring principle related to a prior art.

For aesthetic purposes, a paint is applied to industrial products such as an automobile, home electric appliances and the like. For example, as illustrated in a drawing of FIG. 10A, a metallic painted automobile includes a steel plate substrate 60 to which an electrophoretic paint film 61 is formed in order to prevent corrosion and the like. Further, an anti-chipping primer paint film 62 is formed on the electrophoretic paint film 61 in order to prevent the automobile body from damage of a flying gravel or the like. Further, a middle coat paint film 63 is formed on the anti-chipping primer paint film 62, a base paint film 64 including a pigment and flake pigments is formed on the middle coat paint film 63, and a clear paint film 65 not including the pigment and flake pigments is formed on the base painting film 64. The electrophoretic paint film 61 is formed for corrosion prevention of the substrate, and the anti-chipping primer paint film 62 is formed for preventing the substrate from the damages caused by the flying gravel or the like. A paint film thickness of each paint films needs to be measured and properly controlled because the corrosion prevention function and the damage preventing function may be deteriorated when the paint film thickness is less than a set thickness. Further, the middle coat paint film 63, the base paint film 64 and the clear paint film 65 are closely-associated to the appearance (e.g., color, degree of metallic, brilliance, orange peel and depth of color) of the product. Accordingly, the paint film thickness of each film needs to be measured and properly controlled.

Generally, a thickness of each paint film is measured in a manner where the paint film is firstly dried and measured by means of an eddy current paint film thickness measuring device. The eddy current paint film thickness measuring device may cause damage to the product and may not measure paint film thicknesses of multiple layers.

A non-contacting type paint film thickness measuring device based on an optical interference has been developed in order to reduce the damage caused to the product, however, such device may not measure each paint film thickness of the multiple layers (JP3542346B and JP3326961B).

Figure 10B:
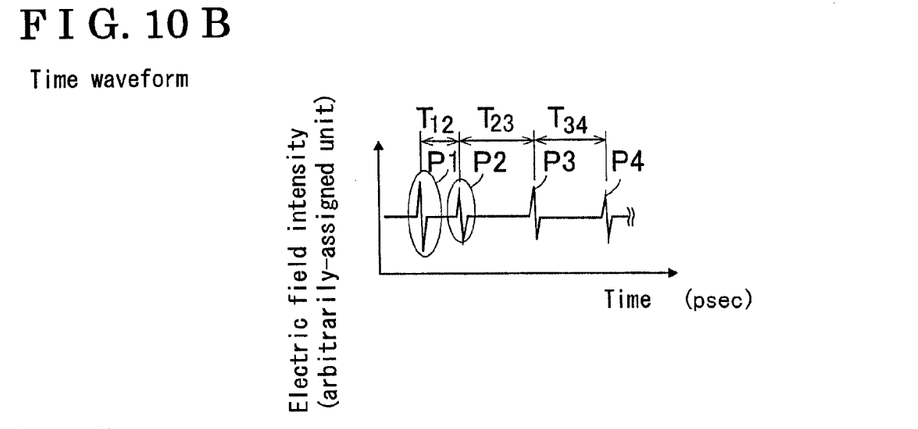
FIG. 10B illustrates an electric field intensity in time-series of the terahertz echo pulse light measured at the paint film illustrated in FIG. 10A for expressing the paint film thickness measuring principle related to the prior art.

Further, another non-contacting type paint film thickness measuring device emitting a terahertz pulse light to an object whose paint film thickness is measured has been developed in response to the abovementioned matters (JP2004-28618A, P6-7, FIGS. 1, 5 and 6). The terahertz pulse light is an electromagnetic wave whose wavelength is 30 to 3000 μm and frequency is 0.1 to 10 THz. The terahertz pulse light passes through a paint film whose main element is a high-polymer material. When the terahertz pulse light is emitted to an object made of plural paint layers indicated in FIG. 10A, the terahertz pulse light is reflected (Fresnel reflection) on each interface IP1 through IP5, each has discontinuous refractive index, and a reflected terahertz pulse light (hereinafter referred to as a terahertz echo pulse light) is obtained. A wave form of electric field intensity in time-series of the terahertz echo pulse light is schematically indicated in the graph of FIG. 10B. The paint film thickness of each paint film is calculated by a formula (1) on the basis of a Time of Flight method using a time difference T1 2 between echo pulses P1 and P2, a time difference T2 3 between echo pulses P2 and P3, and a time difference T3 4 between echo pulses P3 and P4. The echo pulses P1, P2, P3 and P4 appear in the graph of FIG. 10B so as to be adjacent each other.

Paint film thickness=(time difference×light speed)/
(paint film's group refractive index)         (1)

When the paint film thickness is calculated on the basis of the time difference between the adjacent echo pulses, because an optical resolution for measuring the paint film thickness is determined on the basis of a pulse width of the echo pulse, an optical resolution "R" is expressed by the following formula (2) on the basis of the formula (1), in which the pulse width as "τ", a paint film's group refractive index as "n", and a light speed as "c".

$R=\tau c/2n=TRc/n$         (2)

Figure 11:
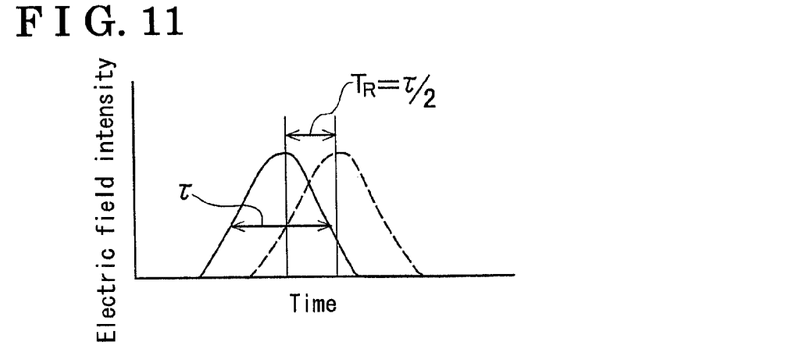
FIG. 11 illustrates a graph for explaining a relation between a pulse width of the terahertz echo pulse and a paint film thickness measuring optical resolution of the terahertz echo pulse.

In other words, as shown in the graph FIG. 11 indicating the terahertz echo pulse light, a minimum time difference TR=τ/2, in which adjacent signals of echo pulses are distinguishable, determines an optical resolution. Accordingly, in order to increase the optical resolution for measuring a paint film thickness, the pulse width of the terahertz echo pulse light needs to be shortened.

According to the abovementioned known paint film thickness measuring device disclosed in JP2004-28618A, a terahertz pulse light whose pulse width "τ" is 400 fs is used (see FIG. 5 in JP2004-28618A), and when an object whose refractive index "n" is 2 is measured, an optical resolution "R" is estimated to 30 μm. In other words, the known paint film thickness measuring device may not measure an object whose paint film thickness is less than 30 μm.

FIG. 11 schematically illustrates the graph indicating a terahertz echo pulse light. Practically, noise may be superposed on the terahertz echo pulse light, and the optical resolution may further be decreased.

Furthermore, the known paint film thickness measuring device has a structure where an object whose paint film thickness is measured is positioned on the optical path between a terahertz pulse light generating portion and a terahertz pulse light detecting portion in a manner where a measured surface of the object specular reflects the terahertz pulse light. Accordingly, when the measured surface of the object exists at a recessed portion of the object, the terahertz pulse light is not specular reflected on the measured surface at the recessed portion, which means a paint film thickness may not be measured when the measured surface exists at the recessed portion of the object.

A need thus exists to provide a non-contacting type paint film thickness measuring device and a method which is not susceptible to the drawback mentioned above.

SUMMARY

According to an aspect of this disclosure, a non-contacting type paint film thickness measuring device includes generating means for generating a terahertz pulse light, detecting means for detecting the terahertz pulse light generated by the generating means, passing through a predetermined optical path, and reaching the detecting means, measured wave form in time-series obtaining means for obtaining a measured wave form in time-series indicating an electric field intensity in time series of a terahertz echo pulse light that is the terahertz pulse light emitted to an object whose paint film thickness is measured, reflected at the object and detected by the detecting means, the object being positioned on the predetermined optical path, intrinsic wave form in time-series obtaining means for calculating an intrinsic wave form in time-series of the object on the basis of a standard wave form in time-series and the measured wave form in time-series, the standard wave form in time-series indicating an electric field intensity in time-series of a reflected light that is the terahertz pulse light generated at the generating means, emitted to a sputtering mirror, reflected at the sputtering mirror, and detected by the detecting means, the sputtering mirror being positioned on the predetermined optical path instead of the object; and the intrinsic wave form in time-series obtaining means including an intrinsic electric field spectrum calculating means and an intrinsic wave form in time-series calculating means, the intrinsic electric field spectrum calculating means calculating an intrinsic electric field spectrum by multiplying a measured electric field spectrum by a standard electric field spectrum and an Wiener inverse filter, the measured electric field spectrum obtained by applying a Fourier transformation to the measured wave form in time-series, the standard electric field spectrum obtained by applying a Fourier transformation to the standard wave form in time-series and the Wiener inverse filter expressed with a constant number, and the intrinsic wave form in time-series calculating means calculating the intrinsic wave form in time-series by applying an inverse Fourier transformation to the intrinsic electric field spectrum with increasing or decreasing the constant number.

According to another aspect of this disclosure, a non-contacting type paint film thickness measuring method; using generating means for generating a terahertz pulse light and detecting means for detecting the terahertz pulse light generated by the generating means, passing through a predetermined optical path, and reaching the detecting means, includes a measured wave form in time-series obtaining step for obtaining a measured wave form in time-series indicating an electric field intensity in time series of a terahertz echo pulse light that is the terahertz pulse light emitted to an object whose paint film thickness is measured, reflected at the object and detected by the detecting means, the object being positioned on the predetermined optical path; and an intrinsic wave form in time-series obtaining step for calculating an intrinsic wave form in time-series of the object on the basis of a standard wave form in time-series and the measured wave form in time-series, the standard wave form in time-series indicating an electric field intensity in time-series of a reflected light that is the terahertz pulse light generated at the generating means, emitted to a sputtering mirror, reflected at the sputtering mirror, and detected by the detecting means, the sputtering mirror being positioned on the predetermined optical path instead of the object, wherein the intrinsic wave form in time-series obtaining step including an intrinsic electric field spectrum calculating step and an intrinsic wave form in time-series calculating step, the intrinsic electric field spectrum calculating step calculating an intrinsic electric field spectrum by multiplying a measured electric field spectrum by a standard electric field spectrum and an Wiener inverse filter, the measured electric field spectrum obtained by applying a Fourier transformation to the measured wave form in time-series, the standard electric field spectrum obtained by applying a Fourier transformation to the standard wave form in time-series and the Wiener inverse filter expressed with a constant number, and the intrinsic wave form in time-series calculating step calculating the intrinsic wave form in time-series by applying an inverse Fourier transformation to the intrinsic electric field spectrum with increasing or decreasing the constant number.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments will be described in accordance with the attached drawings.

First Embodiment

Figure 1:
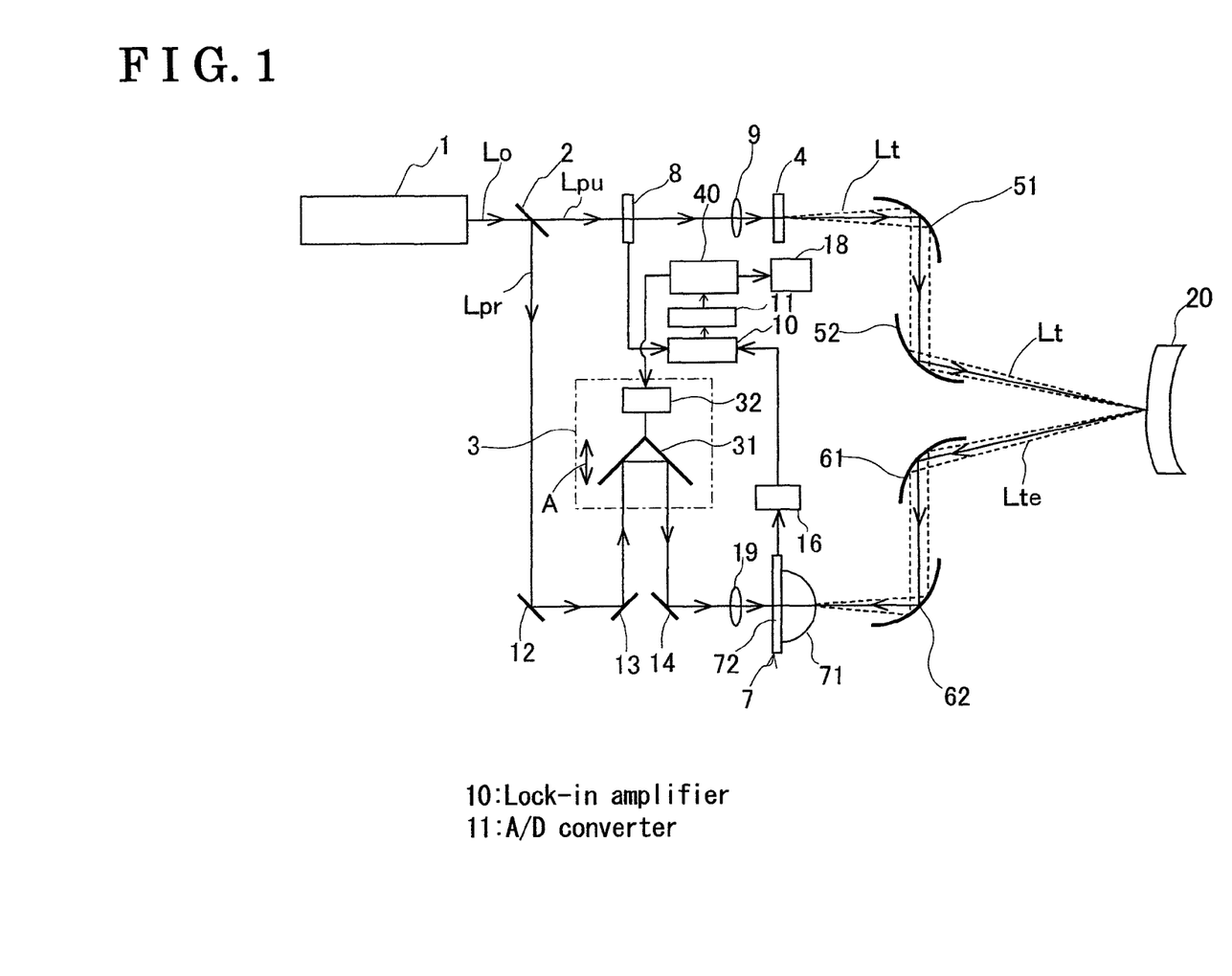
FIG. 1 illustrates a schematic configuration diagram schematically indicating a non-contacting type paint film thickness measuring device of a first embodiment.
Figure 2:
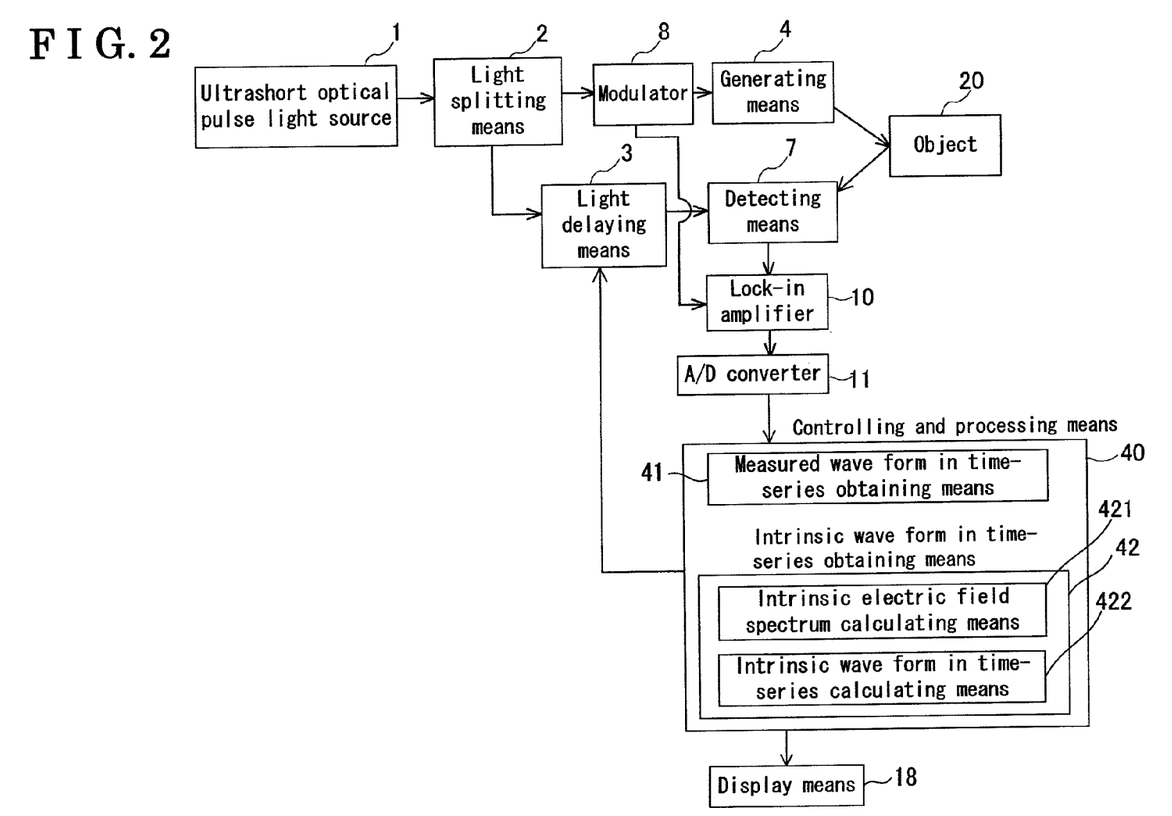
FIG. 2 illustrates a block diagram of the non-contacting type paint film thickness measuring device of the first embodiment.
Figure 3:
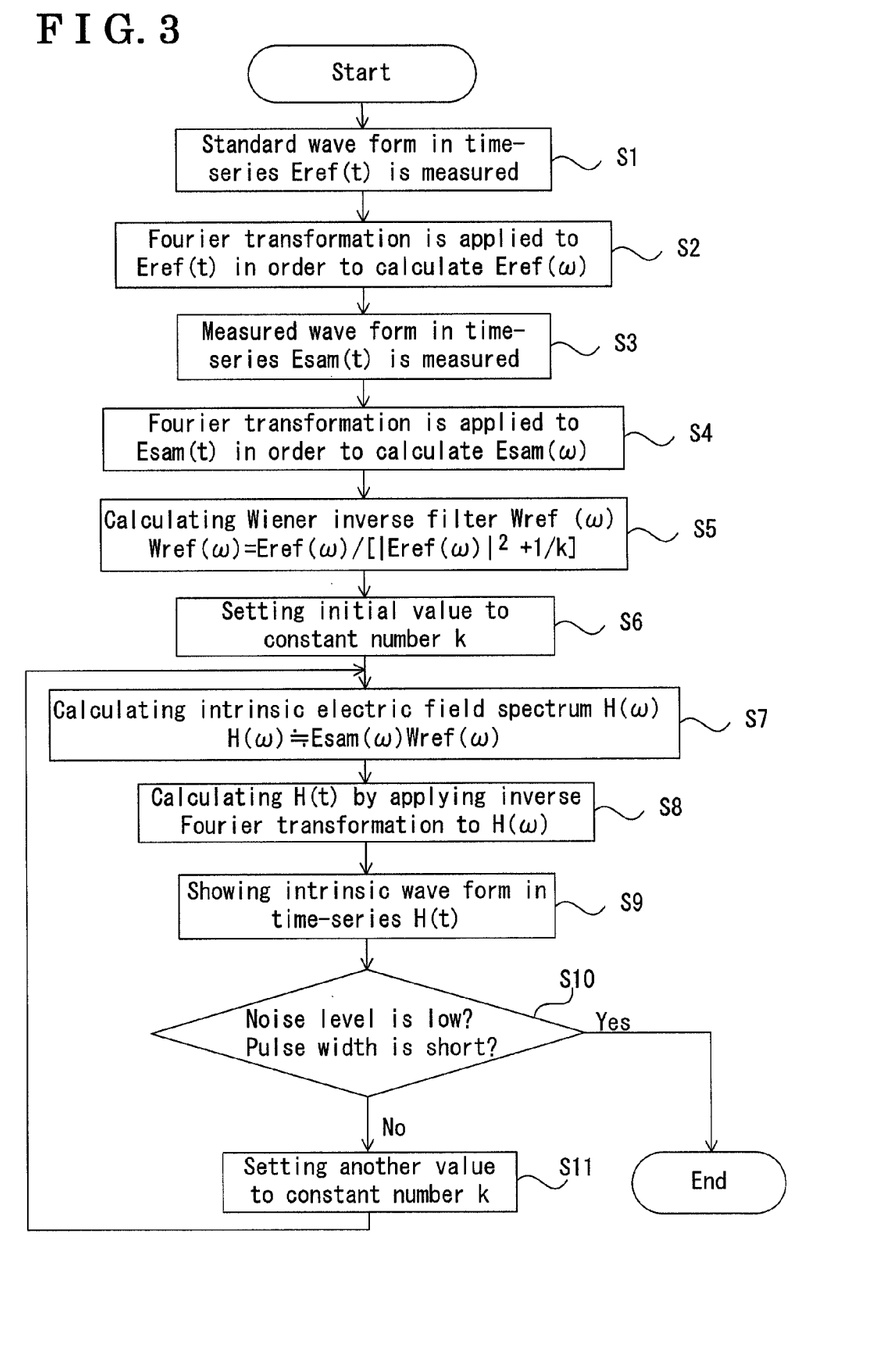
FIG. 3 illustrates a flowchart indicating an actuation of a controlling and processing means of the non-contacting type paint film thickness measuring device in the first embodiment.

FIG. 1 is a configuration diagram schematically indicating a non-contacting type paint film thickness measuring device of a first embodiment. FIG. 2 is a block diagram indicating the non-contacting type paint film thickness measuring device of the first embodiment. FIG. 3 is a flowchart indicating an actuation of a controlling and processing means 40 of the non-contacting type paint film thickness measuring device in the first embodiment.

As indicated in FIG. 1, the non-contacting type paint film thickness measuring device in the first embodiment includes a generating means 4, a detecting means 7 and the controlling and processing means 40. The generating means 4 generates a terahertz pulse light Lt, and the detecting means 7 detects a terahertz echo pulse light Lte. The terahertz echo pulse light Lte is the terahertz pulse light Lt generated at the generating means 4, passed through a predetermined optical path and reached the detecting means 7. The generating means 4 is also referred to as a terahertz pulse light generating means 4.

The non-contacting type paint film thickness measuring device further includes an ultrashort optical pulse light source 1, a light splitting means 2 and a light delaying means 3. The ultrashort optical pulse light source 1 generates a pumping light Lpu used for pumping the terahertz pulse light generating means 4 and a probe light Lpr used for detecting a measured wave form in time-series Esam(t) of the terahertz echo pulse Lte at the detecting means 7. The light splitting means 2 splits an ultrashort optical pulse laser Lo generated at the ultrashort optical pulse light source 1 into the pumping light Lpu and the probe light Lpr. The light delaying means 3 controls an arrival time of the probe light Lpr to the detecting means 7 so as to be delayed relative to the pumping light Lpu.

The ultrashort optical pulse light source 1 is an Er doped fiber laser having SHG crystal. The ultrashort optical pulse light source 1 generates the ultrashort optical pulse laser L0 including a basic wave pulse having a pulse width of 17 fs, a repetition frequency of 50 MHz, a central wavelength of 1550 nm and an output of 100 mW. The ultra short optical pulse laser L0 further includes a second harmonic pulse having a central wavelength of 780 nm and an output of 10 mW.

The repetition frequency may be increased in order to increase a SN ratio of the measured wave form in time-series Esam(t) of the terahertz echo pulse Lte, however, when the repetition frequency is too large, a pulse interval is narrowed, accordingly a scan range within a time range is also narrowed. A laser light whose repetition frequency is set to an appropriate value for an object 20 whose paint film thickness is measured needs to be used. In a case where a paint film whose thickness is 10 μm or less is measured, the pulse width of the terahertz pulse light needs to be minimized. For example, when the paint film whose thickness is 10 μm is measured, if an medium whose refractive index is 2 is used for the paint film, an optical path difference between the reflections on a face and reverse surfaces is calculated to be 40 μm(=2×2×10 μm), and a time difference is calculated to be 130 fs(=40×10$^{-6}$/3×10$^{8}$). Accordingly, the pulse width of the terahertz echo pulse light needs to be approximately 130 fs. When the terahertz pulse light is generated on the basis of a pulse laser whose pulse width is approximately 100 fs, by means of a photoconductive switch having a silicon lens serving as the generating means 4, the pulse width of the terahertz echo pulse light is 1 ps, and when the terahertz pulse light is generated on the basis of a pulse laser whose pulse width is approximately 100 fs, by means of a nonlinear crystal serving as the generating means 4, the pulse width of the terahertz echo pulse light is 500 fs. The pulse width becomes 1 ps because the terahertz pulse light passes through the lens or a substrate of the photoconductive switch having the silicon lens in such a way that the terahertz pulse light may be absorbed or diffused by the lens and the substrate, and the pulse width becomes 500 fs because the terahertz pulse light passes through the nonlinear crystal by receiving influences of a phase mismatching and a absorption. The thickness of the nonlinear crystal may be reduced in order to reduce the effect of the phase mismatching and the absorption, however, this may result in a decrease of the output of the terahertz pulse light. Accordingly, an ultrashort optical pulse laser having a short pulse width may be used in order to generate a terahertz pulse light whose pulse width is shortened.

Because the ultrashort optical pulse light source 1 in the first embodiment generates an ultrashort optical pulse laser having a pulse width of 17 fs, the generating means 4 using a nonlinear crystal may generate a terahertz pulse light having a pulse width of approximate 100 fs, accordingly a paint film thickness of 10 μm, which is considered as a relatively thin paint film, may be measured according to the embodiments (described in detail in first and second examples).

The ultrashort optical pulse light source 1 may not be limited to the above-mentioned configuration, and a Yb doped fiber laser or a titanium-sapphire laser may also be used as the ultrashort optical pulse light source 1.

The light splitting means 2 is a dichroic mirror for splitting the ultrashort optical pulse laser L0 into a pumping light Lpu (basic wave pulse) having a wave length of 1550 nm and a probe light Lpr (second harmonic pulse) having a wave length of 780 nm. In a case where the ultrashort optical pulse light source 1 is a laser device such as a titanium-sapphire laser emitting a laser having a single-wavelength, a beam splitter is used as the light splitting means 2. A beam splitter dealing with a wide wavelength band may be used. A thickness of the diachronic mirror may be 0.5 mm or less in order not to elongate the pulse width.

The light delaying means 3 includes a corner mirror 31 and a moving means 32 for moving the corner mirror 31 in a direction indicated by an arrow A. The light delaying means 3 controls the arrival time of the probe light Lpr, split from the pumping light Lpu by means of the diachronic mirror, relative to the terahertz pulse light Lt generated from the pumping light Lpu. The moving means 32 is controlled by the controlling and processing means 40.

The pumping light Lpu is modulated while passing through a modulator 8. The pumping light Lpu may be larger as long as being modulated to be less than ⅒ of the repetition frequency of the pumping light Lpu. In the embodiment, a chopper is used as the modulator 8, and the pumping light Lpu is modulated so as to be 1 kHz. An acousto-optical modulator (AOM) or an electro-optical modulator (EOM) may be used as the modulator 8 in order to obtain a high-speed modulation.

The modulated pumping light Lpu is collected to the generating means 4 by means of a lens 9. A nonlinear crystal or a photoconductive switch having an antenna may be used as the generating means 4. When the photoconductive switch is used in a manner where it has a permeation property, the terahertz pulse light may be absorbed or diffused by the silicon lens and the substrate, thereby a terahertz pulse light whose pulse width is short may not be generated. The photoconductive switch is used in a manner where it has a reflecting property, in other words the photo conductive switch is used in a manner where the terahertz pulse light does not pass through the silicon lens, because a large portion of the terahertz light is emitted toward the substrate that has high-dielectric constant, a level of the output of the terahertz pulse light may be decreased. Accordingly, a nonlinear crystal may preferably be used as the generating means 4, by which a terahertz pulse light may be generated by simply collecting the pumping light Lpu to the nonlinear crystal. Following materials may be used as the nonlinear crystal: excitonic properties of II-VI and III-V semiconductors such as ZnTe, ZnSe, GaP, GaAs, CdTe and GaSe; a nonlinear crystal for wavelength conversion such as $LiNbO_3$, $MgO:LiNbO_3$, $Fe:LiNbO_3$, $LiTaO_3$, $BBO(\beta BaB_2O_2)$, $LBO(LiB_3O_5)$, KTP ($KTiOPO_4$), $AgGaS_2$ and $AgGaSe_2$; or a ferroelectric crystal such as KDP, ADP, KNbO3, BaTiO3, lead series ferroelectric material or zirconium series ferroelectric material. The generating means 4 may be a lead series relaxer such as PMN, PZN, PZT and the like or a quantum paraelectrics series relaxer such as KTa1-xNbxO3, K1-xLixTaO3 and Sr1-xCax-TiO3 and the like. The generating means 4 may also be an organic nonlinear crystal such as DAST (4-dimethylamino-N-methyl-4 stilbazolium tosylate). In the embodiment, DAST whose thickness is 0.1 mm is used as the generating means 4. When the pumping light Lpu is emitted to the DAST 4, a terahertz pulse light Lt is generated by the effect $\chi^{(2)}$ of the crystal.

The terahertz pulse light Lt generated at the generating means 4 is collimated at an off-axis paraboloidal mirror 51 and collected to the object 20 by means of an off-axis paraboloidal mirror 52.

The terahertz pulse light Lt is reflected on the object 20 so as to be a terahertz echo pulse light Lte. The terahertz echo pulse light Lte is collimated at an off-axis paraboloidal mirror 61 and collected to the detecting means 7 by means of an off-axis paraboloidal mirror 62.

The detecting means 7 includes a silicon lens 71 and a photoconductive switch 72. The photoconductive switch 72 has a dipole antenna formed on a low-temperature growth GaAs board. The detecting means 7 obtains a measured wave form in time-series Esam(t) that is a time waveform of an electric field amplitude of the terahertz echo pulse Lte inputted in the dipole antenna whose gap portion is excited by the probe light Lpr.

An apparatus indicated by a numeral 16 is a pre-amplifier for amplifying an electric signal outputted by the photoconductive switch 72.

An apparatus indicated by a numeral 10 is a lock-in amplifier for extracting certain elements from the signal detected by the photoconductive switch 72 and amplifying the extracted elements. The elements to be extracted are synchronized with a signal modulated by a chopper 8.

An apparatus indicated by a numeral 11 is an A/D converter.

An apparatus indicated by a numeral 40 is a controlling and processing means for storing and processing positional information of the light delaying means 3 and data of the A/D converter 11. The controlling and processing means 40 also has a function for controlling the moving means 32 of the light delaying means 3. The controlling and processing means 40 serves as a non-contacting type paint film thickness measuring method.

The controlling and processing means 40 includes a measured wave form in time-series obtaining means 41 and an intrinsic wave form in time-series obtaining means 42. The measured wave form in time-series obtaining means 41 obtains a measured wave form in time-series Esam (t) that is a wave form of electric field intensity in time-series of the terahertz echo pulse light Lte. The terahertz echo pulse light Lte is the terahertz pulse light Lt emitted toward and reflected at the object 20 and detected by the detecting means 7. The intrinsic wave form in time-series obtaining means 42 calculates an intrinsic wave form in time-series H(t) that is intrinsic for the object whose paint film thickness is measured, on the basis of the measured wave form in time-series Esam(t) and a standard wave form in time-series Eref(t). The standard wave form in time-series Eref(t) is a standard wave form and is obtained as follows. The terahertz pulse light Lt is emitted to a sputtering mirror that is used instead of the object 20 and reflected thereat so as to be a reflected light. The reflected light of the sputtering mirror is detected by the detecting means 7. A wave form of electric field intensity in time-series of the detected reflected light is the standard wave form in time-series Eref(t).

The intrinsic wave form in time-series obtaining means 42 includes an intrinsic electric field spectrum calculating means 421 and an intrinsic wave form in time-series calculating means 422. The intrinsic electric field spectrum calculating means 421 obtains an intrinsic electric field spectrum H(ω) by multiplying a measured electric field spectrum Esam(ω) by a standard electric field spectrum Eref(ω) and a Wiener inverse filter Wref(ω) that is expressed with a constant number k. The measured electric field spectrum Esam(ω) is obtained by applying a Fourier transformation to the measured wave form in time-series Esam(t), and the standard electric field spectrum Eref(ω) is obtained by applying the Fourier transformation to the standard wave form in time-series Eref(t). The intrinsic wave form in time-series calculating means 422 calculates an intrinsic wave form in time-series H(t) by applying an inverse Fourier transformation to the intrinsic electric field spectrum H(ω) with increasing or decreasing the constant number k. The controlling and processing means 40 executes a process indicated by the flowchart in FIG. 3. A computer or the like may configure the controlling and processing means 40.

A method for obtaining the intrinsic wave form in time-series H(t) on the basis of the measured wave form in time-series Esam(t) will be explained. The following formulas have an integration range from −∞ to +∞.

The terahertz pulse light Lt emitted toward and reflected at the sputtering mirror is detected by the detecting means 7, and a wave form of electric field intensity in time-series E(t) of the reflected light of the sputtering mirror is measured in advance. The wave form in time-series E(t) of the reflected light of the sputtering mirror will be indicated as the standard wave form in time-series Eref(t).

The Fourier transformation is applied to the standard wave form in time-series Eref(t) in order to obtain the standard electric field spectrum Eref(ω) as expressed by a formula (3).

$$Eref(\omega)=\int Eref(t)\exp(i\omega t)dt \quad (3)$$

Further, the Fourier transformation is applied to the measured wave form in time-series Esam(t) in order to obtain the measured electric field spectrum Esam(ω) as expressed by a formula (4).

$$Esam(\omega)=\int Esam(t)\exp(i\omega t)dt \quad (4)$$

The Wiener inverse filter Wref(ω) is calculated as expressed by a formula (5).

$$Wref(\omega)=Eref(\omega)/[|Eref(\omega)|^2+1/k] \quad (5)$$

In this formula, "k" is a constant number.

Further, the intrinsic electric field spectrum H(ω) is calculated as expressed by a formula (6).

$$H(\omega)=Esam(\omega)/Eref(\omega)\approx Esam(\omega)Wref(\omega) \quad (6)$$

The inverse Fourier transformation is applied to the intrinsic electric field spectrum H(ω) in order to obtain the intrinsic wave form in time-series H(t) as expressed by a formula (7).

$$H(t) = (2\pi)^{-1} \int H(\omega)\exp(-i\omega t)d\omega \approx \qquad (7)$$

$$(2\pi)^{-1} \int Esam(\omega)Wref(\omega)\exp(-i\omega t)d\omega$$

An actuation of the non-contacting type paint film thickness measuring device will be explained.

An ultrashort optical pulse laser Lo generated at the ultrashort optical pulse light source 1 is split into the pumping light Lpu and the probe light Lpr by the diachronic mirror 2.

After intensity-modulation at the chopper 8, the pumping light Lpu is collected by the lens 9 and emitted toward the DAST 4 in an axis c thereof. A terahertz pulse light Lt is generated by an effect $\chi^{(2)}$ of the DAST 4.

After collimated at the off-axis paraboloidal mirror 51 of the incidence optics 5, the terahertz pulse light Lt is collected to the object 20 by means of the off-axis paraboloidal mirror 52. The terahertz pulse light Lt is reflected on interfaces of the object 20 each of which has unique refractive index, and the reflected light becomes the terahertz echo pulse light Lte.

The terahertz echo pulse light Lte emitted from the object 20 is collimated at the off-axis paraboloidal mirror 61 of a light receiving optical system 6, and the collimated terahertz echo pulse light Lte is collected to the photoconductive switch 72 by means of the off-axis paraboloidal mirror 62 via the silicon lens 71.

The probe light Lpr split from the ultrashort optical pulse laser Lo at diachronic mirror 2 passes the light delaying means 3 and is collected to the photoconductive switch 72 by means of the lens 19. The photoconductive switch 72 obtains a measured wave form in time-series Esam(t) by scanning the light delaying means 3. The measured wave form in time-series Esam(t) is a wave form of electric field intensity in time-series of the terahertz echo pulse light Lte. Specifically, a signal of the photoconductive switch 72 is amplified by means of the amplifier 16, and the amplified signal is further amplified by means of the lock-in amplifier 10 and stored in the controlling and processing means 40 as data in order to obtain the measured wave form in time-series Esam(t) of the terahertz echo pulse light Lte An example of an actuation of the controlling and processing means 40 in the embodiment will be explained in accordance with the flowchart in FIG. 3. Once the controlling and processing means 40 starts its actuation, the measured wave form in time-series obtaining means 41 of the controlling and processing means 40 measures the standard wave form in time-series Eref(t) at the sputtering mirror (Step S1). Then, the Fourier transformation is applied to the standard wave form in time-series Eref(t) in order to calculate the standard electric field spectrum Eref(ω) (Step S2). Then, the measured wave form in time-series obtaining means 41 measures the measured wave form in time-series Esam(t) of the object 20 (Step S3), and the Fourier transformation is applied to the measured wave form in time-series Esam(t) in order to calculate the measured electric field spectral Esam(ω) (Step S4). Steps S3 and S4 serve as a measured wave form in time-series obtaining step.

Further, the intrinsic electric field spectrum calculating means 421 calculates the Wiener inverse filter Wref (ω) expressed by the formula (5) in Step S5 and sets an initial value to the constant number k in Step S6.

Then, the intrinsic electric field spectrum calculating means 421 calculates intrinsic electric field spectrum H(ω) on the basis of the formula (6) substituting Wref(ω) thereinto in Step S7. Further, the intrinsic wave form in time-series calculating means 422 applies the inverse Fourier transformation to the intrinsic electric field spectrum H(ω) in order to calculate the intrinsic wave form in time-series H(t) in Step S8. Steps S5, S6, S7 and S8 serve as an intrinsic wave form in time-series obtaining step. Specifically, Steps S5, S6 and S7 serve as an intrinsic electric field spectrum calculating step, and Step 8 serves as an intrinsic wave form in time-series calculating step.

The controlling and processing means 40 then shows the intrinsic wave form in time-series H(t) in Step S9 and determines whether or not the noise level of the intrinsic wave form in time-series H(t) is low and the pulse width of the intrinsic wave form in time-series H(t) is short in Step S10.

When the controlling and processing means 40 determines that the noise level is not low and the pulse width is not short, another value is set to the constant number k in Step S11, and then the process returns to Step S7.

On the other hand, when the controlling and processing means 40 determines that the noise level is low and the pulse width is short, the controlling and processing means 40 terminates its actuation.

As mentioned above, because the non-contacting type paint film thickness measuring device increases and decreases the value of the constant number k of the Wiener inverse filter, the noise level of the intrinsic wave form in time-series H(t) may be decreased, and the pulse width of the wave form in time-series H(t) may be shortened. Accordingly, the paint film thickness measuring optical resolution may be increased.

Second Embodiment

Figure 4:
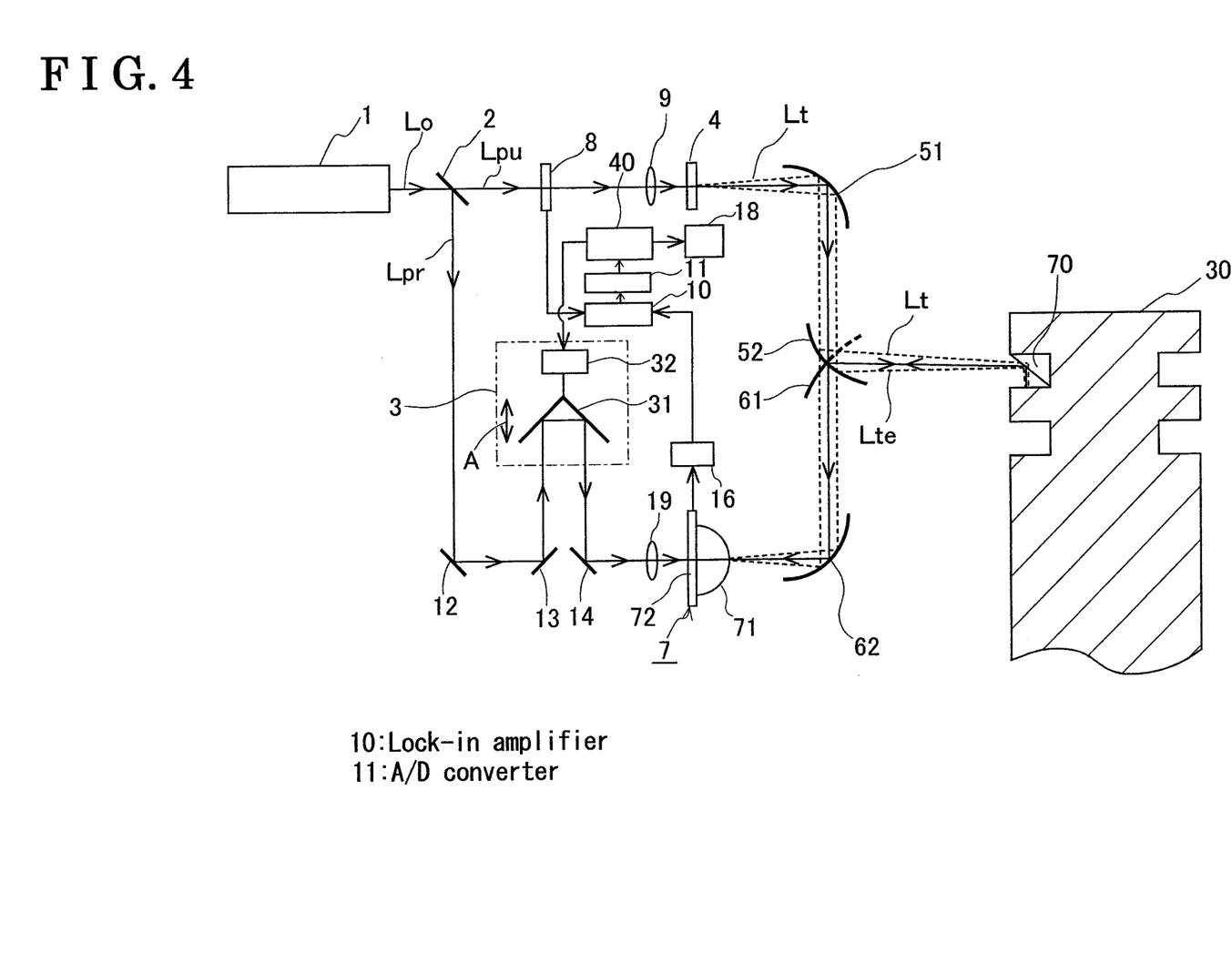
FIG. 4 illustrates a schematic configuration diagram schematically indicating a non-contacting type paint film thickness measuring device of a second embodiment.

FIG. 4 is a configuration diagram schematically indicating the non-contacting type paint film thickness measuring device of a second embodiment. The non-contacting type paint film thickness measuring device in the second embodiment has an approximately same configuration as that in the first embodiment, where the device has an optical path bending means 70, and the positions of the off-axis paraboloidal mirror 52 and the off-axis paraboloidal mirror 61 are different from that in the first embodiment. Specifically, according to the second embodiment, the off-axis paraboloidal mirror 52 and the off-axis paraboloidal mirror 61 are positioned so as to overlap each other in a direction orthogonal to the FIG. 4, and the optical path bending means 70 is used for bending the optical path and is provided between the terahertz pulse light generating means 4 and the object 20 whose paint film thickness is measured. Elements that are identical to the non-contacting type paint film thickness measuring device in the first embodiment are indicated by numerals that are used for the corresponding elements in the first embodiment, and explanations of the identical elements are omitted.

The object 30 whose paint film thickness is measured in the second embodiment is an aluminum cylinder piston head to which a groove for a seal ring is formed.

The optical path bending means 70 is a surface reflecting prism for measuring a thickness of an alumite film on a horizontal surface of a recessed groove portion of the piston head.

The terahertz echo pulse light Lt generated at the generating means 4 is collimated at the off-axis paraboloidal mirror 51 and then collected in a right-lower direction by means of the off-axis paraboloidal mirror 52. The terahertz pulse light Lt collected by the off-axis paraboloidal mirror 52 is reflected on the optical path bending means 70 and is collected to the horizontal surface of the recessed groove portion. The terahertz echo pulse light Lte reflected on the horizontal surface of the recessed groove portion is further reflected on the optical path bending means 70 and is collimated by means of the off-axis paraboloidal mirror 61.

Because the non-contacting type paint film thickness measuring device in the second embodiment includes the optical path bending means 70 between the generating means 4 and the object 30 whose paint film thickness is measured in order to bent the optical path, the paint film thickness of the recessed groove portion of the object 30 may be measured.

First Example

The paint film thickness of the paint film is measured by use of the non-contacting type paint film thickness measuring device.

Figure 5:
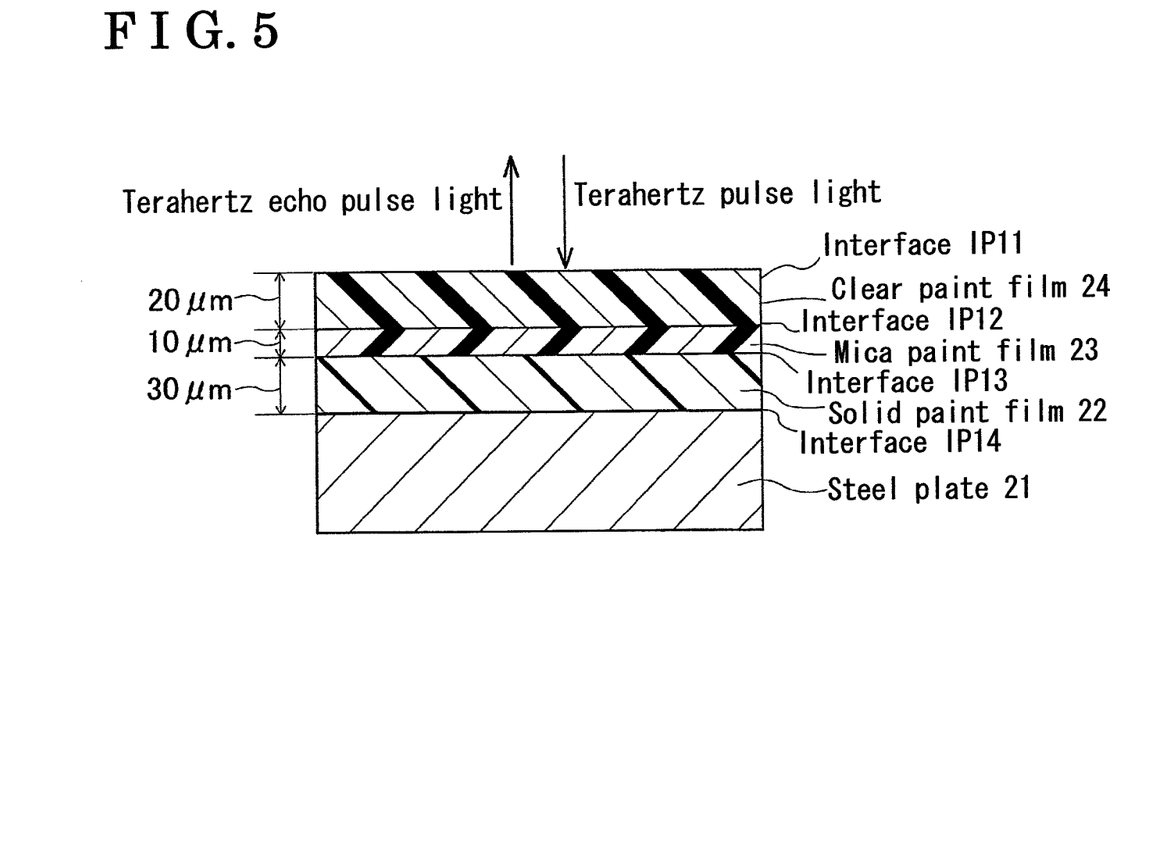
FIG. 5 illustrates a cross-sectional view of an object whose paint film thickness is measured in a first example by the non-contacting type paint film thickness measuring device of the first embodiment illustrated in FIGS. 1 and 2.

The object whose paint film thickness is measured is a steel plate 21 to which a solid paint film 22, a mica paint film 23 and a clear paint film 24 are applied so as to be overpainted as illustrated in FIG. 5. The solid paint film 22 includes a pigment, and the mica paint film 23 includes mica flake pigments. Each time after the paint film is applied to the steel plate 21, the thickness of the paint film is measured by means of a contacting type paint fill thickness measuring apparatus such as an eddy current paint film thickness measuring apparatus. Measuring results are as follows. The paint film thickness of the solid paint film 22 is 30 µm, the paint film thickness of the mica paint film 23 is 10 µm, and the paint film thickness of the clear paint film 24 is 20 µm.

Following are results of the refractive index of each paint film measured by use of an ellipsometer. The refractive index of the solid paint film 22 is 2.1, the refractive index of the mica paint film 23 is 1.5, and the refractive index of the clear paint film 24 is 1.8.

Figure 6:
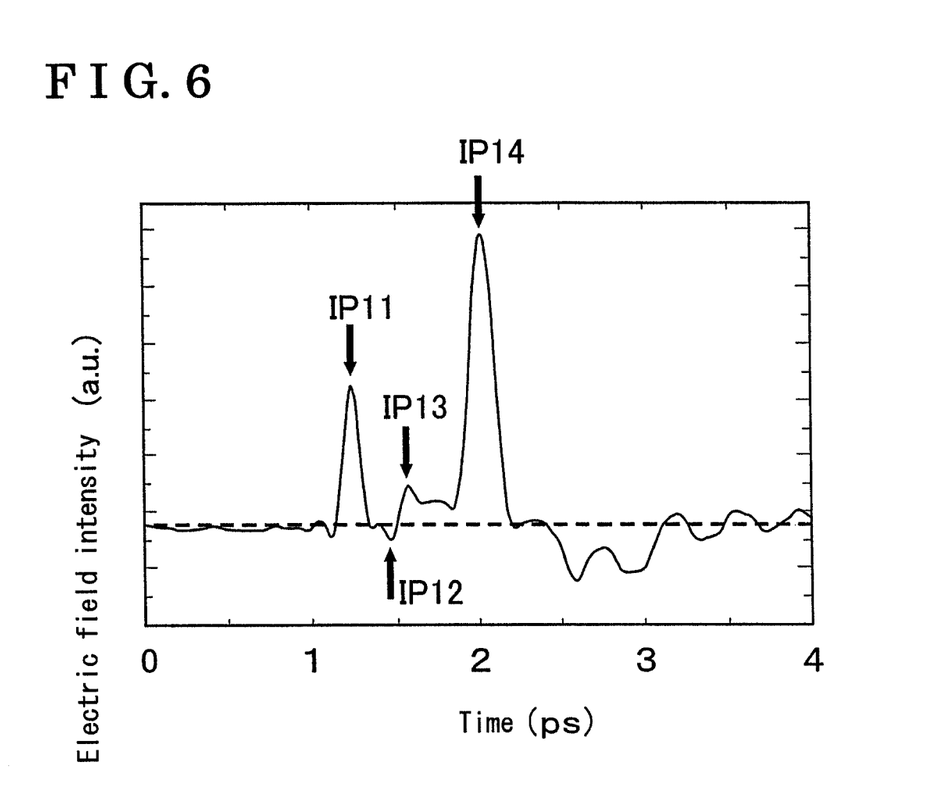
FIG. 6 illustrates a graph indicating an intrinsic wave form in time-series calculated by processing a measured wave form in time-series obtained from the object whose paint film thickness is measured indicated in FIG. 5.

FIG. 6 is a graph indicating an intrinsic wave form in time-series obtained by calculating the measured wave form in time-series of the object illustrated in FIG. 5. Specifically, the intrinsic wave form in time-series obtained by the calculation by use of the Wiener inverse filter whose constant number k is adjusted (increased or decreased) in order to reduce the noise level and shorten the pulse width.

The graph in FIG. 6 firstly forms an upward projection indicating an echo pulse signal reflected on an interface IP11 existing between the air and the clear paint film 24.

Then, 220 fs after the echo pulse signal of the interface IP11 is generated, an echo pulse signal (downwardly projecting portion) reflected on an interface IP12 existing between the clear paint film 24 and the mica paint film 23 is generated. 100 fs after the echo pulse signal reflected on the interface IP12 is generated, an echo pulse signal reflected on an interface IP13 existing between the mica paint film 23 and the solid paint film 22 is generated. 440 fs after the echo pulse signal reflected on the interface IP13 is generated, an echo pulse signal reflected on an interface IP 14 existing between the solid paint film 22 and the steel plate 21 is generated.

The echo pulse signal of the interface IP12 is indicated by the downward projection because the mica painting film 23 has the refractive index of 1.5 that is smaller than the refractive index 1.8 of the clear paint film 24. Small signals existing between the echo pulse signal of the interface IP13 and the echo pulse signal of the interface IP14 in FIG. 6 are generated by the reflection on the mica flake pigments in the mica paint film 23. In the time range after the echo pulse signal of the interface IP14, a plurality of multiple echoes is shown.

The values of refractive index of each paint film (1.8, 1.5 and 2.1) and time difference between the signals obtained on the basis of the graph in FIG. 6 (220, 100 and 440 fs) are subtracted into the formula (1) in order to calculate the paint film thickness of each paint film. Calculated results are as follows. The paint film thickness of the clear paint film 24 is 18 µm, the paint film thickness of the mica paint film 23 is 10 µm and the paint film thickness of the solid paint film 22 is 31 µm.

Comparing the paint film thickness values measured by use of the non-contacting type paint film thickness measuring device to the values measured by use of the known eddy current paint film thickness measuring apparatus, differences therebetween are ±2 µm.

Because the non-contacting type paint film thickness measuring device calculates the intrinsic wave form in time-series with adjusting (increasing or decreasing) the constant number k of the Wiener inverse filter in order to reduce the noise level and shorten the pulse width of the signal, the paint film thickness of 10 µm could be measured by the non-contacting type paint film thickness measuring device.

The pulse width of the echo pulse signal at the interface IP11 existing between the air and the clear paint film 24 is 150 fs. Subtracting the pulse width 150 fs into the formula (2), the paint film thickness measuring optical resolution is 12.5 µm. This result is not matched to the 10 µm. The optical resolution may be calculated by use of the formula (2) only when the refractive indexes of plural paint films are increased in series. In other words, the optical resolution may be appropriately calculated only when all of the signals are shown in upwardly projecting forms. In the case of the embodiments, because the refractive index of the second film is smaller than that of the first film, the echo pulse signal of the interface IP12 that exists between the first film and the second film is shown in a downwardly projecting form. Accordingly, the paint film thickness measuring optical resolution does not follow the formula (2).

When the second film has a refractive index that is smaller than the first film's refractive index as in the case of the embodiments, the constant number k of the Wiener inverse filter may be adjusted so as to be increased or decreased in order to reduce the noise level so that a peak of the signal whose wavelength is relatively low may appear, rather than adjusting the constant number k of the Wiener inverse filter so as to be increased or decreased in order to shorten the pulse width of the signal.

Second Example

A paint film thickness of the alumite film is measured by means of the non-contacting type paint film thickness measuring device in the first embodiment.

Figure 7:
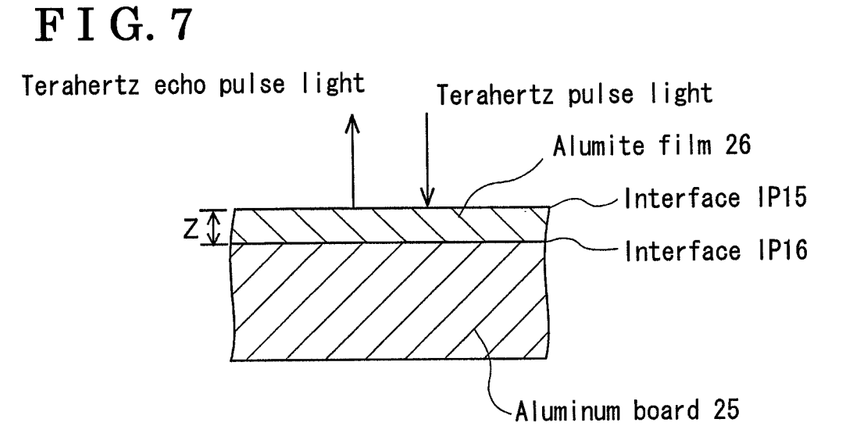
FIG. 7 illustrates a cross section of an object whose paint film thickness is measured in an second example by the non-contacting type paint film thickness measuring device of the first embodiment in FIGS. 1 and 2.
Figure 8:
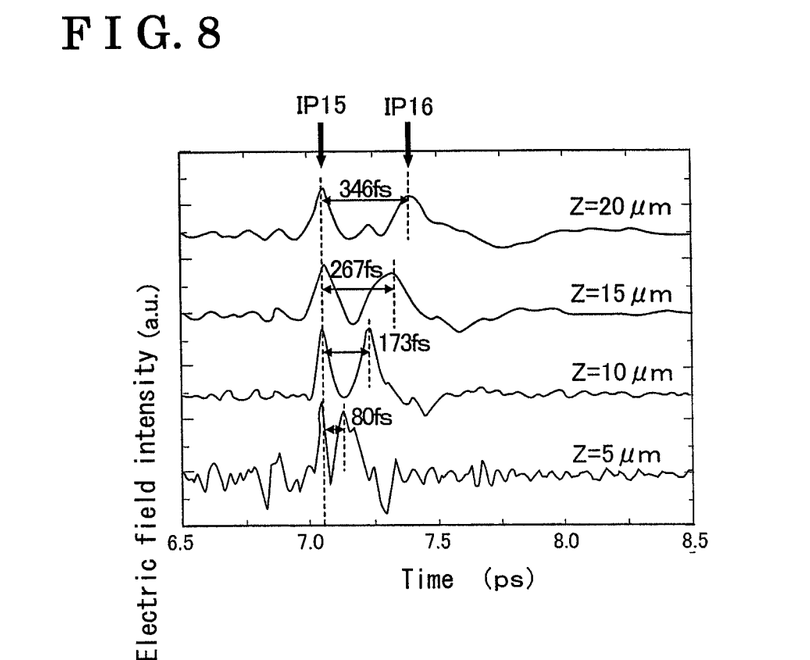
FIG. 8 illustrates a graph indicating intrinsic wave forms in time-series each calculated by processing a measured wave form in time series obtained from the object whose paint film thickness is measured indicated in FIG. 7.

FIG. 7 is a cross section of the object 20 whose paint film thickness is measured (hereinafter simply referred to as an object 20). FIG. 8 is a graph of intrinsic wave forms in time-series obtained by calculating the measured wave form in time-series of the object 20. In other words, the intrinsic wave form in time-series is obtained by adjusting the constant number k of the Wiener inverse filter so as to be increased or decreased in order to reduce the noise level and shorten the pulse width.

The object includes the aluminum board 25 to which the alumite film 26 is applied as illustrated in FIG. 7. In this example, four different alumite films whose paint film thicknesses Z are different from each other are prepared. Specifically, the paint film thicknesses Z of 5 µm, 10 µm, 15 µm and 20 µm are used. Before the four films are selected, a number of samples which are made under a various conditions of an alumite process are prepared. Those alumite films whose paint film thicknesses Z are 5 µm, 10 µm, 15 µm and 20 µm are selected from the prepared samples in microscopical observation. A refractive index of the alumite film is measured by an ellipsometer, and a measured result is 5.2.

The graph in FIG. 8 shows intrinsic wave forms in time-series of the alumite film 26 whose paint film thickness Z are 20 µm, 15 µm, 10 µm and 5 µm, in the mentioned order.

As in the graph of FIG. 8, in all selected samples, firstly the echo pulse lights reflected on each interface IP15 existing between the air and the alumite film 26 is observed. In a case of the thickness 20 µm, 346 fs after the echo pulse light is generated at the interface P15, an echo pulse light is generated at an interface IP16 existing between the alumite film 26 and the aluminum board 25. In a case of the thickness 15 µm, 267 fs after the echo pulse light is generated at the interface P15, an echo pulse light is generated at an interface IP16 existing between the alumite film 26 and the aluminum board 25. In a case of the thickness 10 µm, 173 fs after the echo pulse light is generated at the interface P15, an echo pulse light is generated at an interface IP16 existing between the alumite film 26 and the aluminum board 25. In a case of the thickness 5 µm, 80 fs after the echo pulse light is generated at the interface P15, an echo pulse light is generated at an interface IP16 existing between the alumite film 26 and the aluminum board 25.

Figure 9:
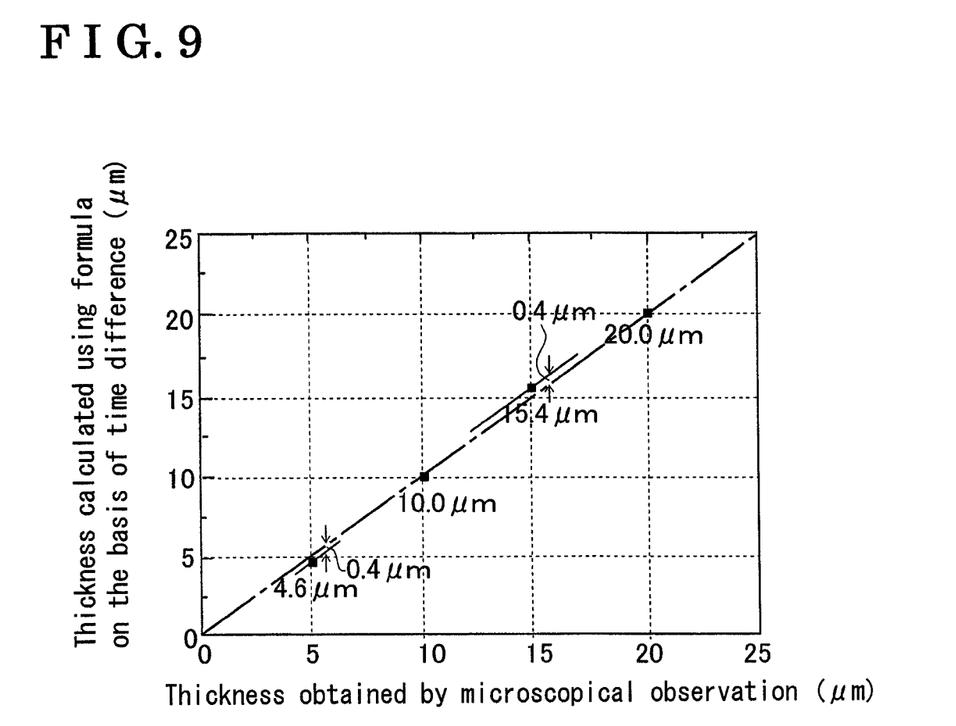
FIG. 9 illustrates a graph in which calculated paint film thicknesses are plotted in a manner where paint film thicknesses of each paint film calculated by substituting a time difference between signals obtained on the basis of FIG. 8 into a formula (1) is indicated in a vertical axis, and paint film thicknesses obtained on the basis of a microscopical observation of a cross section of the object is indicated in a horizontal axis.

FIG. 9 is a graph in which a paint film thickness of each film are calculated with a formula (1) to which the refractive index 5.2 and the time differences 346, 267, 173 and 80 fs indicated in the graph of FIG. 8 are plotted in a vertical axis, and a paint film thickness of each film on the basis of the microscopical observation are plotted in a horizontal axis.

As in the graph of FIG. 9, setting the paint film thicknesses obtained by the microscopical observation as true values, a measurement error is ±0.4 µm.

The non-contacting type paint film thickness measuring device in the embodiment may measure the thickness of the alumite film in an accuracy of ±0.4 µm in a manner where the intrinsic wave form in time-series is calculated by increasing or decreasing the constant number k of the Wiener inverse filter in order to reduce the noise level and shorten the pulse width of the signal.

According to the intrinsic wave form in time-series at the lowest portion in the graph of FIG. 8, the pulse width of the first echo pulse light is 36 fs. The paint film thickness measuring optical resolution is calculated as 1 µm on the basis the formula (2) into which the pulse width 36 fs is subtracted.

The paint film thickness of the alumite film has not been measured with a non-contacting method or without breaking an object to be measured, however, according to the non-contacting type paint film thickness measuring device in the embodiments, the paint film thickness may be measured with high accuracy and high optical resolution, which are proved in the above-mentioned examples.

According to the first and second embodiments, a level of the noise and the pulse width of the intrinsic wave form in time-series obtained by the intrinsic wave form in time-series obtaining means and step be reduced.

According to the second embodiment, optical path bending means is provided between the generating means and the object in order to bent the predetermined optical path. Thus, the recessed portion of the object whose paint film thickness is measured may be measured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A non-contacting type paint film thickness measuring device comprising:
   a generator for generating a terahertz pulse light;
   a predetermined optical path;
   a detector for detecting the terahertz pulse light generated by the generator, passing through the predetermined optical path, and reaching the detector;
   a sputtering mirror;
   measured wave form in time-series obtaining means for obtaining a measured wave form in time-series indicating an electric field intensity in time series of a terahertz echo pulse light that is the terahertz pulse light emitted to an object whose paint film thickness is to be measured, reflected at the object and detected by the detector, the object being positioned on the predetermined optical path;
   intrinsic wave form in time-series obtaining means for calculating an intrinsic wave form in time-series of the object on the basis of a standard wave form in time-series and the measured wave form in time-series, the standard wave form in time-series indicating an electric field intensity in time-series of a reflected light that is the terahertz pulse light generated at the generator, emitted to the sputtering mirror, reflected at the sputtering mirror, and detected by the detector, the sputtering mirror being positioned on the predetermined optical path instead of the object at the location of the object; and
   the intrinsic wave form in time-series obtaining means including an intrinsic electric field spectrum calculating means and an intrinsic wave form in time-series calculating means, the intrinsic electric field spectrum calculating means calculating an intrinsic electric field spectrum by multiplying a measured electric field spectrum by a standard electric field spectrum and an Wiener inverse filter, the measured electric field spectrum obtained by applying a Fourier transformation to the measured wave form in time-series, the standard electric field spectrum obtained by applying a Fourier transformation to the standard wave form in time-series and the Wiener inverse filter expressed with a constant number, and the intrinsic wave form in time-series calculating means calculating the intrinsic wave form in time-series by applying an inverse Fourier transformation to the intrinsic electric field spectrum with increasing or decreasing the constant number.

2. The non-contacting type paint film thickness measuring device according to the claim 1, wherein optical path bending means is provided between the generator and the object in order to bent the predetermined optical path.

3. A non-contacting type paint film thickness measuring method; comprising:
   generating a terahertz pulse light by a generator;
   detecting by a detector the terahertz pulse light generated by the generator, passing through a predetermined optical path, an object whose paint film thickness is to be measured being positioned on the predetermined optical path, detecting by a detector a reflected light that is the terahertz pulse light generated at the generator, emitted to a sputtering mirror, reflected at the sputtering mirror, the sputtering mirror being positioned on the predetermined optical path instead of the object, obtaining a measured wave form in time-series indicating an electric field intensity in time series of a terahertz echo pulse light that is the terahertz pulse light emitted to the object whose paint film thickness is to be measured, reflected at the object and detected by the detector; and calculating an intrinsic wave form in time-series of the object on the basis of a standard wave form in time-series and the measured wave form in time-series, the standard wave form in time-series indicating an electric field intensity in time-series of the reflected light that is the terahertz pulse light generated at the generator, emitted to the sputtering mirror, reflected at the sputtering mirror, and detected by the detector, wherein the intrinsic wave form in time-series obtaining step including an intrinsic electric field spectrum calculating step and an intrinsic wave form in time-series calculating step, the intrinsic electric field spectrum calculating step calculating an intrinsic electric field spectrum by multiplying a measured electric field spectrum by a standard electric field spectrum and an Wiener inverse filter, the measured electric field spectrum obtained by applying a Fourier transformation to the measured wave form in time-series, the standard electric field spectrum obtained by applying a Fourier transformation to the standard wave form in time-series and the Wiener inverse filter expressed with a constant number, and the intrinsic wave form in time-series calculating step calculating the intrinsic wave form in time-series by applying an inverse Fourier transformation to the intrinsic electric field spectrum with increasing or decreasing the constant number.

4. The non-contacting type paint film thickness measuring method according to claim 3, wherein an optical path between the generator and the object is bent by means of optical path bending means.

* * * * *